United States Patent [19]
Kawamura et al.

[11] Patent Number: 5,479,845
[45] Date of Patent: Jan. 2, 1996

[54] FLUID SUPPLY ASSEMBLY FOR WORKING VEHICLES

[75] Inventors: Masahisa Kawamura, Amagasaki; Ryota Ohashi, Kobe, both of Japan

[73] Assignee: Kanzaki Kokyukoki Mfg. Co., Ltd., Amagasaki, Japan

[21] Appl. No.: 183,504

[22] Filed: Jan. 18, 1994

[30] Foreign Application Priority Data

Feb. 17, 1993 [JP] Japan .................................. 5-051407

[51] Int. Cl.⁶ .................................................. F15B 13/06
[52] U.S. Cl. .................... 91/514; 91/516; 91/532; 60/422
[58] Field of Search ............................. 91/514, 516, 532; 60/422

[56] References Cited

U.S. PATENT DOCUMENTS 4,643,442 2/1987 Ohashi et al. ........................ 280/461

Primary Examiner—F. Daniel Lopez

[57] ABSTRACT

Cylinder head (81) of a hydraulic lift cylinder (39) includes a fluid input port (74) and first fluid output port (75) to be connected respectively to a pump (46) and to a power steering mechanism (40). These ports preferably open at one and the other side surfaces of the head. The head further includes a second fluid output port (83) and fluid inlet port (84) which open at a front surface of the head. These ports are connected through an inside of a cover member (49a, 50a; 201; 250a) detachably mounted on the front surface of head. The head includes therein a flow divider (47) which divides inflow of the input port into first and second flows directed respectively to the first and second output ports. Fluid returned into the inlet port is directed towards a first control valve assembly (48) for the lift cylinder. A second control valve assembly (49; 250) for an auxiliary implement can be provided using the cover member as its valve housing with remaining fluid pipings to the input and first output ports unchanged. A third control valve assembly (50) can further be provided by mounting it on an upper surface on the second assembly.

11 Claims, 16 Drawing Sheets

FLUID SUPPLY ASSEMBLY FOR WORKING VEHICLES

FIELD OF THE INVENTION

This invention relates to a fluid supply assembly for use in a working vehicle which comprises a hydraulic lift mechanism for lifting and lowering an auxiliary implement to be connected liftably to the vehicle, a control valve assembly mounted on a cylinder case of the hydraulic lift mechanism for controlling supply of fluid to a lift cylinder of the lift mechanism, and a power steering mechanism for steering the vehicle.

BACKGROUND OF THE INVENTION

A well-calculated fluid supply assembly of this purpose is disclosed in U.S. Pat. No. 4,643,442. In this prior art assembly, the cylinder head of a cylinder case of the hydraulic lift cylinder includes at its front surface a vertical seating surface on which one or more control valve assemblies for fluid-operated auxiliary implememts are mounted. For meeting the circumstances that the number of auxiliary implements to be equipped is often changed in accordance with a specific design of the working vehicle, the control valve assemblies are fashioned as a stack valve in which control valve assemblies of the number corresponding to that of auxiliary implements are successively integrated on the front of the cylinder head such that fluid output ports of the valve assemblies open upwards. A cover is attached to the front of such one or more control valve assemblies. This cover includes a fluid input port to be connected to a hydraulic pump and a fluid output port to be connected to a power steering mechanism such that these ports open forwards. The cover further includes a flow divider which divides inflow supplied to the fluid input port into two flows so that fluid supplied by a single pump can be used for operating the power steering mechanism and for operating fluid-operated auxiliary implements and hydraulic lift cylinder. One of the output flows of the flow divider is directed to the fluid output port for the power steering mechanism, while the other output flow of the flow divider is directed into the control valve assemblies. The latter output flow is further directed into the cylinder head and then to the control valve assembly for the hydraulic lift cylinder.

In this fluid supply assembly, the cylinder head of hydraulic lift cylinder is skillfully used for the purpose of providing valves for operating three or more fluid-operated devices including hydraulic lift cylinder and power steering mechanism by fluid fed by a single pump in a compact fashion. However, there remain certain problems.

Firstly, the fluid supply assembly set forth above is fashioned on the assumption that a working vehicle is necessarily equipped not only with an auxiliary implement, such as a rotary tiller or rear-mount mower, to be connected liftably to and to be drawn by the vehicle but also with at least one more auxiliary implement such as a front loader, snow-removing implement or bulldozing implement to be eqipped at a front of the vehicle or mid-mount mower. However, some working vehicles are of a design in which only an auxiliary implement to be connected liftably to the vehicle is to be equipped. The fluid supply assembly set forth above does not permit employment of valves of a same fundamental structure also in such vehicles for enhancing economy.

Secondly, the cover including two fluid ports set forth above is shifted in position in a londitudinal direction of the vehicle when the number of control valve assemblies is changed in accordance with a change in number of fluid-operated auxiliary implements. Consequently, positions of the fluid input port to be connected to a pump and fluid output port to be connected to a power steering mechanism are also changed in the same direction. From this, fluid pipings of different designs are required even between vehicles which are identical with one another in the vehicle structure itself and are different only in number of fluid-operated auxiliary implements to be equipped.

Further, valve assemblies integrated successively in the longitudinal direction of the vehicle will require to disassemble all of them even when one of them is exchanged for another one or even when one valve assembly is added or removed. In addition, although the fluid output ports of valve assemblies opening upwards and pipings connected thereto are well covered or protected by a seat which is usually disposed above a rear portion of a working vehicle, metal pipes generally used for such fluid pipings will require a certain vertical interval between the valve assemblies and seat so that level of the seat will sometimes be heightened unduly for a working vehicle used in orchards or the like.

Accordingly, a primary object of the present invention is to provide a novel fluid supply assembly having a fundamental structure which makes the assembly applicable also to a working vehicle to be equipped with only an auxiliary implement to be connected liftably to the vehicle.

An attendant object of the invention is to provide a novel fluid supply assembly which assures a compactness of the assembly.

Another attendant object is to provide a fluid supply assembly into which a control valve means for a fluid-operated auxiliary implement can be incorporated with ease while permitting use of pipings of the same design for feeding fluid from a pump to the assembly and for supplying fluid from the assembly to a power steering mechanism.

A further object of the present invention is to provide a fluid supply assembly in which a control valve means is arranged in a way not requiring an undue heightening of a seat.

A still further object of the invention is to provide a fluid supply assembly to which, in addition to a control valve means for a fluid-operated auxiliary implement, one or more control valve means can be added with ease.

SUMMARY OF THE INVENTION

The present invention relates to a fluid supply assembly for use in a working vehicle comprising a hydraulic lift mechanism for lifting and lowering an auxiliary implement to be connected liftably to the vehicle, a control valve assembly mounted on a cylinder case of the lift mechanism for cotrolling supply of fluid to lift cylinder of this mechanism, and a power steering mechanism for steering the vehicle.

According to the present invention, cylinder head of the cylinder case set forth above includes a fluid input port which opens at an outer surface of the head, and a flow divider which divides inflow supplied to the fluid input port into two divided flows. The head further includes a first fluid output port which opens at an outer surface of the head for supplying one of the divided flows to the power steering mechanism. Cylinder head further includes a second fluid output port for taking-out the other divided flow and a fluid inlet port for directing fluid flow towards the control valve assembly for the lift cylinder. These two ports open at a front surface of the head and are connected through fluid passage means within a cover member which is detachably mounted on the front surface of cylinder head.

In this fundamental structure that a divided fluid flow from the flow divider is to be taken out through the second fluid output port and is returned again through the cover member and through the fluid inlet port into the cylinder head, a control valve assembly for a fluid-operated auxiliary implement can be additionally provided by using the cover member as a valve housing for such control valve assembly. That is, while a cover member which includes in it only a fluid passage for connecting between the second fluid output port and fluid inlet port may be satisfactorily employed for a fluid supply assembly for use in working vehicles of a design which is to be equipped with only an auxiliary implement to be connected liftably to the vehicle, a cover member in which a valve or valves composing a control valve assembly is housed is employed for a fluid supply assembly for use in working vehicles of a design which is to be equipped with a fluid-operated auxiliary implement in addition to an auxiliary implement to be connected liftably to the vehicle. In these two fluid supply assemblies, the positions of the fluid input port to be connected to a pump and first fluid output port to be connected to a power steering mechanism are identical because these two ports are formed in the cylinder head. Consequently, fluid pipings of the same design can be used between vehicles of the two designs for connecting the fluid supply assembly to a pump and to a power steering mechanism. It is preferred to form a vertical seating surface in the front surface of cylinder head for mounting the cover member, because a horizontal posture is given to the cover member by such vertical seating surface so that a horizontal posture is given also to a control valve assembly provided using such cover member as a valve housing whereby the control valve assembly is disposed within a room before the cylinder head without occupying any excessive space.

As outer surfaces of the clyinder head at which the fluid input port and first fluid output port are to open respectively, a side surface or side surfaces is/are preferred because of an easiness of piping to these ports. One and the other side surfaces are preferably selected as such surfaces because an interference between pipings to be connected to the two ports can be avoided with ease.

For avoiding an enlargement of the cylinder head in thickness so as to assure a compactness of the fluid supply assembly, it is preferred to dispose the flow divider within the cylinder head such that the divider extends laterally of the head. In such a structure, the fluid input port and first fluid output port are preferably disposed such that these ports opens at one and the other side surfaces of the head along an axial direction of the flow divider. In this case, a thorough bore across the head can be formed in the head for accomodating the divider such that the two ports are provided by one and the other ends of this bore.

A relief valve for determining fluid pressure in the second fluid output port is preferably disposed within the cylinder head such that the relief valve is located apart from the flow divider in a vertical direction and extends parallel with the flow divider. This arrangement of the relief valve cotributes also to avoiding an enlargement of the cylinder head in thickness.

In a fluid supply assembly in which a control valve assembly for a fluid-operated auxiliary implement is mounted on the front surface of cylinder head, fluid output port or ports of this control valve assembly is/are preferably disposed so as to open at a front surface of the cover member constituting a valve housing of the valve assembly and to thereby keep the level of a seat low. Such arrangement of fluid output port(s) cannot be adopted in the prior art assembly disclosed in the aforecited U.S. patent because a cover attached to the front of a control valve assembly includes a fluid input port to be connected to a pump, a fluid output port to be connected to a power steering mechanism, and a flow divider. Contrary to this, corresponding two ports and flow divider are included, in the fluid supply assembly according to the present invention, in the cylinder head so that fluid output port(s) of the control valve assembly may open forwards, as described above.

An additional control valve assembly for an additional fluid-operated auxiliary implement is preferably provided such that a separate valve housing of this valve assembly is detachably mounted on an upper surface of the cover member and such that fluid output port or ports of this additional valve assembly open(s) at a front surface of the valve housing thereof. According to this structure, the additional control valve assembly can be employed or incorporated while the control valve assembly mounted on the front of cylinder head and fluid piping therefor remain unchanged. So far as a room remains above this additional control valve assembly, a further additional control valve assembly can be provided on the additional valve assembly in a similar fashion.

Although several preferred embodiments will be described in which a hydraulic lift mechanism is mounted on a rear portion of vehicle, the present invention is applicable also to a vehicle having a hydraulic lift mechanism mounted on a fronter portion thereof for lifting and lowering an auxiliary implement to be connected liftably to a front of the vehicle.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
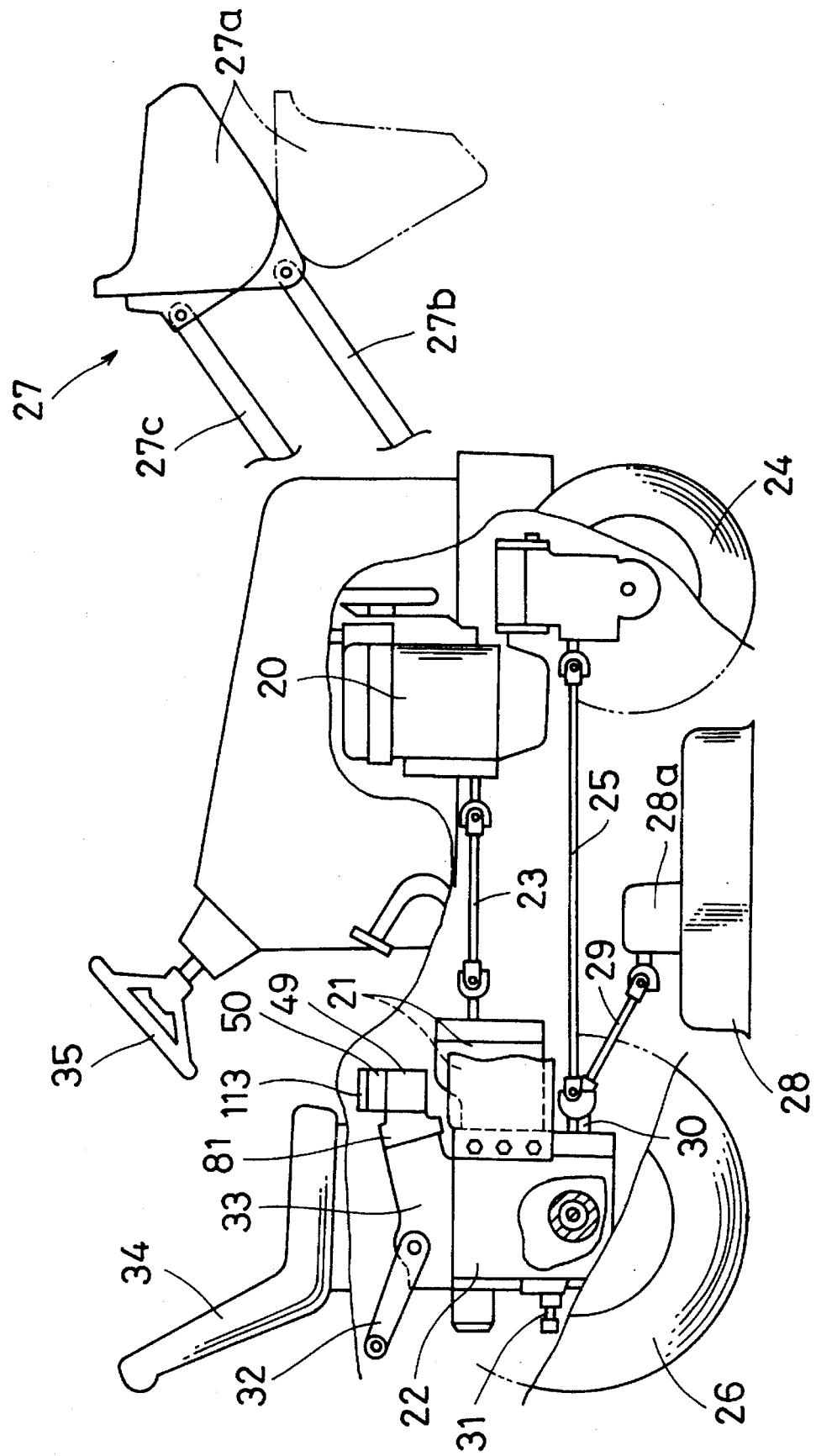
FIG. 1 is a schematic side view, partially cut-away, of a working vehicle in which a first embodiment of the fluid supply assembly according to the present invention is employed.

FIGS. 1 to 14 show a first preferred embodiment of the fluid supply assembly according to the present invention which is employed in a tractor-fashioned vehicle shown in FIG. 1.

As shown in FIG. 1, an engine 20 is mounted on a front portion of the vehicle frame. On a rear portion of the vehicle frame, there are mounted a hydrostatic transmission 21 and a transmission casing 22 which are in an overlapped relationship with each other in a longitudinal direction of the vehicle. A transmission shaft 23 is provided for transmitting power from engine 20 to the hydrostatic transmission 21, and another transmission shaft 25 is provided for transmitting power from the inside of the transmission casing 22 towards front wheels 24. The vehicle is traveled by driving rear wheels 26 and, when required, front wheels 24 with a variable speed which may be controlled by the hydrostatic transmission 21 and by a transmission mechanism (not shown) in the transmission casing 22.

The vehicle shown is fashioned such that it may be equipped with a front loader 27 shown in FIG. 1 at a front of the vehicle, a mid-mount mower 28 also shown in FIG. 1 at an underside of the vehicle and between the front and rear wheels 24 and 26, and another auxiliary implement such as a rotary tiller, grass collector or the like (not shown) at a rear of the vehicle. For operating the front loader 27, a hydraulic mechanism is provided as will be detailed later. For driving the mower 28, a mid-PTO shaft 30 is provided which extends forwardly from the inside of the transmission casing 22 and is adapted to transmit power into a gear box 28a of the mower 28 through a transmission shaft 29. For driving an auxiliary implement to be drawn by the vehicle, a rear-PTO shaft 31 is provided which extends rearwardly from the inside of the transmission casing 22.

For lifting and lowering an auxiliary implement to be drawn by the vehicle, a hydraulic lift mechanism having left and right lift arms 32 is mounted on a top of the transmission casing 22. A seat 34 is located above a cylinder case 33 of the lift mechanism, and a steering wheel 35 is located before the seat 34. The vehicle is steered by operating the steering wheel 35 so as to turn left and right front wheels 24 through a power steering mechanism which will be detailed later.

Figure 2:
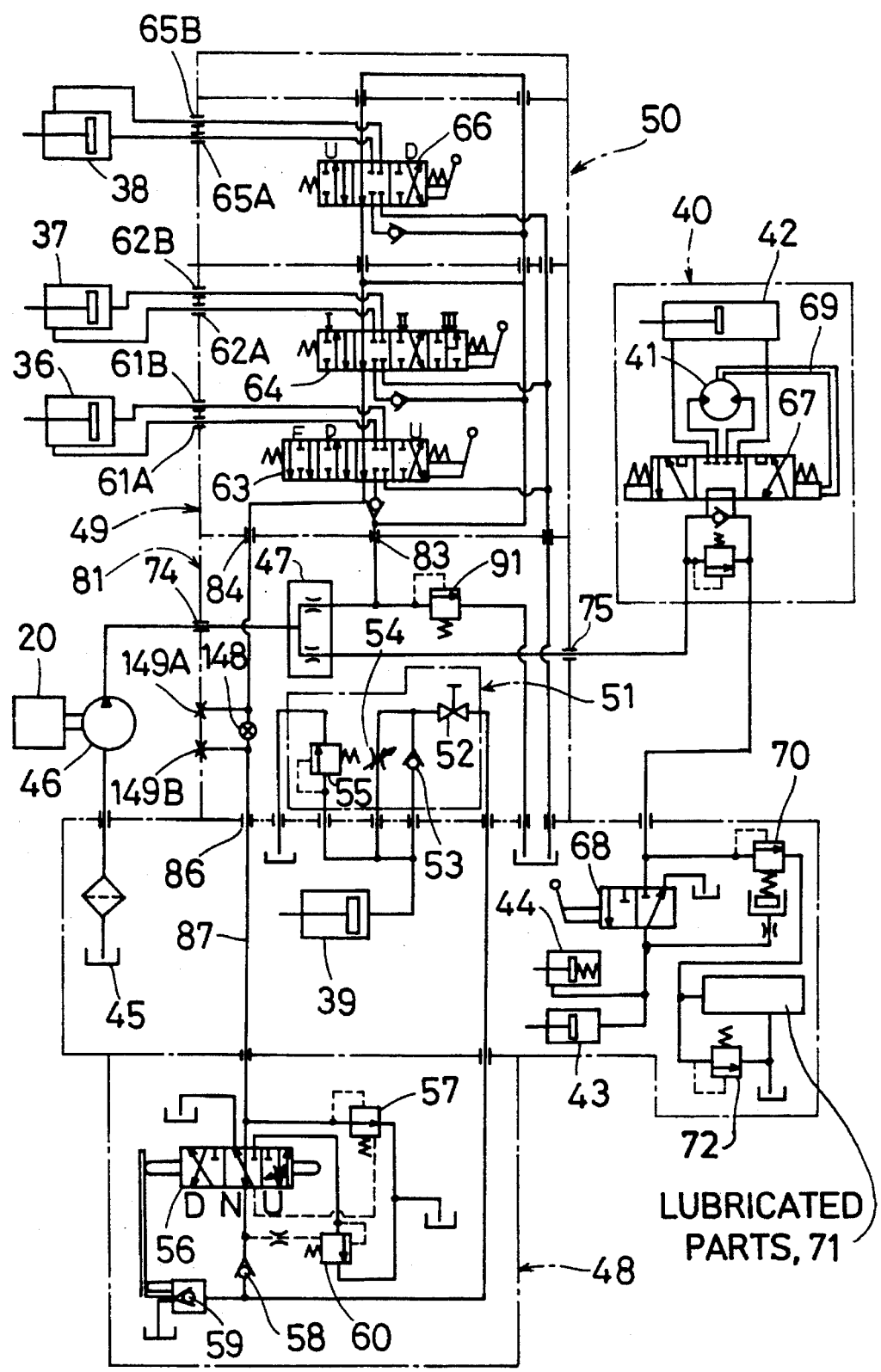
FIG. 2 is a schematic view showing hydraulic circuits provided in the vehicle shown in FIG. 1.

FIG. 2 illustrates hydraulic circuits provided in the vehicle shown in FIG. 1. As hydraulic actuator means for operating front loader 27 shown in FIG. 1, there are provided a lift cylinder 36 for lifting and lowering a bucket 27a through a pair of lift arms 27b (both shown in FIG. 1) and a tilt cylinder 37 for tilting the bucket 27a through link means 27c shown in FIG. 1. Mower 28 shown in FIG. 1 is supported by the vehicle frame through a link mechanism (not shown) such that it may be moved between a lower operative position and an upper non-operative position by means of a mower-lift cylinder 38 shown in FIG. 2. These hydraulic cylinders are fashioned to double-acting ones, as shown in FIG. 2. A single-acting mower-lift cylinder may be employed in place of the mower-lift cylinder 38 shown.

As is usual, the hydraulic lift mechanism comprises a single-acting lift cylinder 39 shown in FIG. 2. As is also usual, power steering mechanism 40 comprises a metering motor 41 and a power cylinder 42. In FIG. 2, numeral 43 designates an actuating cylinder for a fluid-operated PTO-clutch (not shown) which is disposed within the transmission casing 22 and is incorporated in a power take-off transmission line (not shown) for transmitting power to the PTO shafts 30 and 31 shown in FIG. 1. The PTO-clutch referred to above is associated with a brake (not shown) for braking the driven side of the clutch at a disengaged condition of this clutch, and such brake is disactuated by a hydraulic cylinder 44 shown in FIG. 2.

Fluid to be supplied to the various hydraulic actuators referred to above is accomodated within the transmission casing 22 using this casing also as a fluid tank 45 shown in FIG. 2. As shown in FIG. 2, a hydraulic pump 46 driven by engine 20 is provided for supplying fluid from the tank 45. Output port of this pump 46 is connected to a flow divider 47 which divides the output flow of pump 46 into two flows. It is fashioned that one of such divided flows is directed towards the metering motor 41 and power cylinder 42 of the power steering mechanism 40 and then towards the hydraulic cylinders 43 and 44 within the transmission casing, whereas the other divided flow is directed towards the lift cylinder 36, tilt cylinder 37 and mower-lift cylinder 38 and then towards the hydraulic lift cylinder 39.

As also shown in FIG. 2, there are provided a first control valve assembly 48 for controlling supply of fluid to the hydraulic lift cylinder 39, a second control valve assembly 49 to controlling supply of fluid to the lift cylinder 36 and tilt cylinder 37, and a third control valve assembly 50 for controlling supply of fluid to the mower-lift cylinder 38. It is fashioned that one of the divided flows is supplied to the second and third control valve assemblies 49 and 50 and then, through these valve assemblies, to the first control valve assembly 48. A final valve mechanism 51 is disposed between the first control valve assembly 48 and hydraulic lift cylinder 39 and comprises a stop valve 52 for selectively stopping supply and drainage of fluid in respect to the hydraulic lift cylinder 39 by closing fluid path communicated with this cylinder 39, slow-return valve means including a check valve 53 for a quick supply of fluid to the cylinder 39 and an adjustable area throttle 54 connected in parallel with the check valve 53 for a slow drainage of fluid from the cylinder 39, and an overload-relief valve 55 for avoiding application of an excessive fluid pressure to the cylinder 39.

As is usual, the first control valve assembly 48 includes a directional control valve 56 for controlling supply and drainage of fluid in respect to the hydraulic lift cylinder 39, an unloader valve 57 for unloading fluid supplied under pressure from the hydraulic pump 46 with a low pressure at neutral position N and implement-lowering position D of the control valve 56, a non-return check valve 58 for preventing return of fluid from the lift cylinder 39 at neutral position N and lowering position D of the control valve 56, and an unloader check valve 59 which, when the control valve 56 is displaced to the lowering position D, is displaced together to its open position so as to permit drainage of fluid from the lift cylinder 39. In the valve assembly 48 shown, a relief valve 60 is provided to which fluid pressure in the output line of control valve 56 is applied as a back pressure so that it regulates the flow rate of fluid supplied to the hydraulic lift cylinder 39 at implement-lifting position U of the control valve 56 in cooperation with a variable area throttle which is incorporated in this valve 56 so as to be inserted in the fluid supply passage when the valve 56 is displaced to the lifting position U.

The second control valve assembly 49 comprises, as control valve means for the front loader 27 shown in FIG. 1, a pair of fluid output ports 61A and 61B to be connected to the lift cylinder 36 and another pair of fluid output ports 62A and 62B to be connected to the tilt cylinder 37. This second control valve assembly 49 comprises two directional control valves 63 and 64. Of these control valves, control valve 63 located at the side of flow divider 47 has, as a control valve for controlling supply and drainage of fluid in respect to the lift cylinder 36, a neutral position shown where it brings both of the output ports 61A and 61B in a blocked condition, a lifting position U where it operates to control flow of fluid so as to extend lift cylinder 36, a lowering position D where it operates to control flow of fluid so as to contract lift cylinder 36, and a floating position F where it operates to drain fluid from both of the fluid chambers in the cylinder 36 so that lift arm 27b shown FIG. 1 is in a floating state at its lowered condition. The other control valve 64 has, as a control valve for controlling supply and drainage of fluid in respect to the tilt cylinder 37, a neutral position shown where it brings both of the output ports 62A and 62B in a blocked condition, a tilting position I where it operates to control flow of fluid so as to contract tilt cylinder 37 and to thereby tilt bucket 27a shown in FIG. 1, a dumping position II where it operates to control flow of fluid so as to extend the cylinder 37 and to thereby provide a dumping movement to the bucket 27a, and a quick damping position III where it operates to supply also return fluid from the contracting fluid chamber in the cylinder 37 to the extending fluid chamber in this cylinder so as to extend tilt cylinder 37 quickly and to thereby provide a quick dumping movement to the bucket 27a.

The third control valve assembly 50 comprises, as a control valve means for lifting and lowering the mower 28 shown in FIG. 1, a pair of fluid output ports 65A and 65B to be connected to the mower-lift cylinder 38. This control valve assembly 50 includes a directional control valve 66 having a neutral position shown where it brings both of the output ports 65A and 65B in a blocked condition, a lifting position U where it operates to control flow of fluid so as to extend mower-lift cylinder 38, and a lowering position D where it operates to control flow of fluid so as to contract the cylinder 38.

In FIG. 2, numeral 67 designates a directional control valve for the metering motor 41 and power cylinder 42 and numeral 68 designates a directional control valve for the hydraulic cylinders 43 and 44. The former control valve 67 which is adapted to be operated by the steering wheel 35 shown in FIG. 1 is fashioned to a servo valve which is returned to its neutral position shown by the metering motor 41 through a feedback means 69. Control valve mechanism including the control valve 68 further comprises a relief valve 70 of a pressure-modulating type for the cylinder 43 and a secondary relief valve 72 for establishing pressure of fluid to be supplied as lubricant oil to portions 71 to be lubricated. The other parts of FIG. 2 to which no reference has been made hereinbefore will be detailed later.

Figure 3:
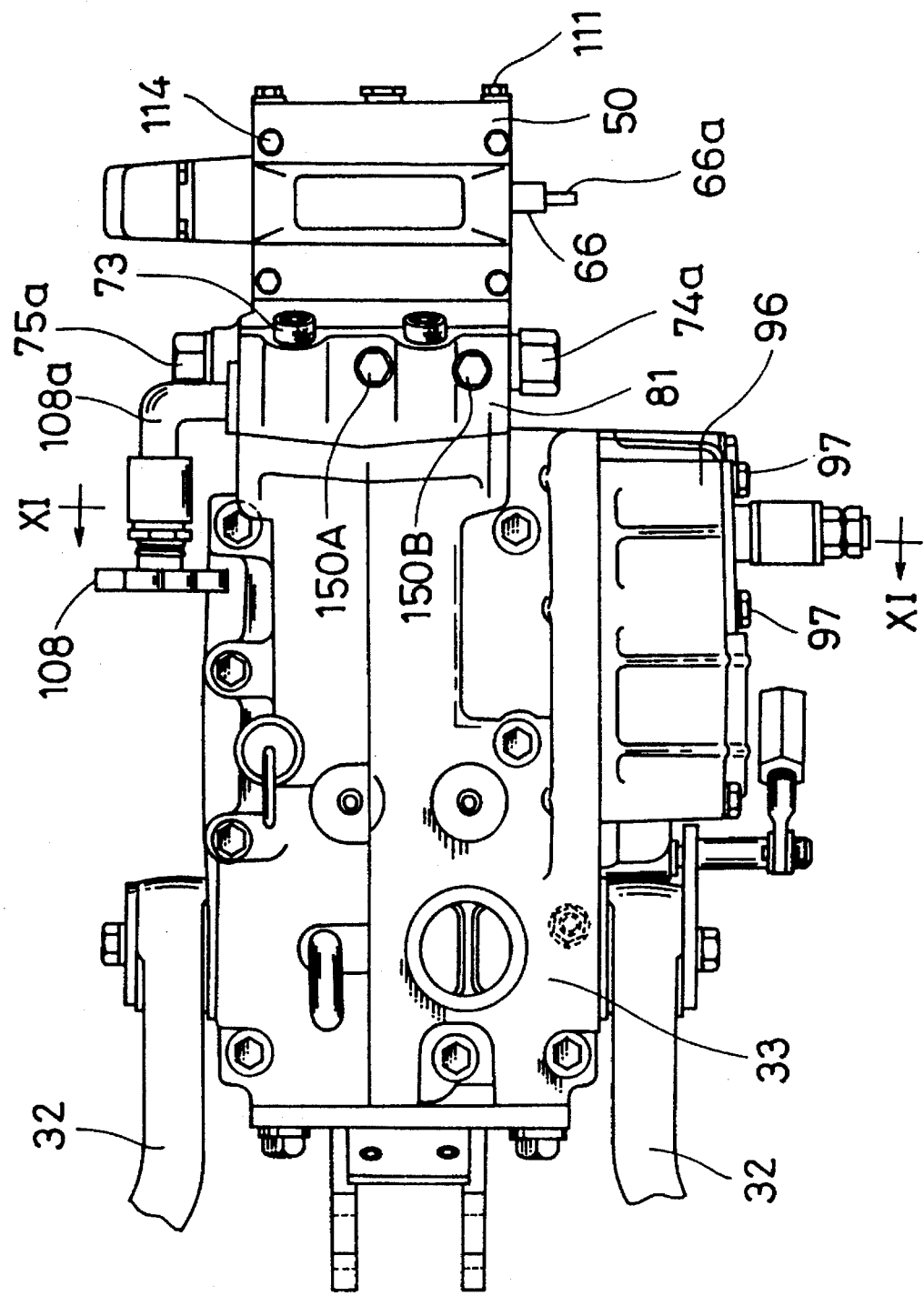
FIG. 3 is a plane view showing a hydraulic lift mechanism and control valve assemblies employed in the vehicle shown in FIG. 1.
Figure 4:
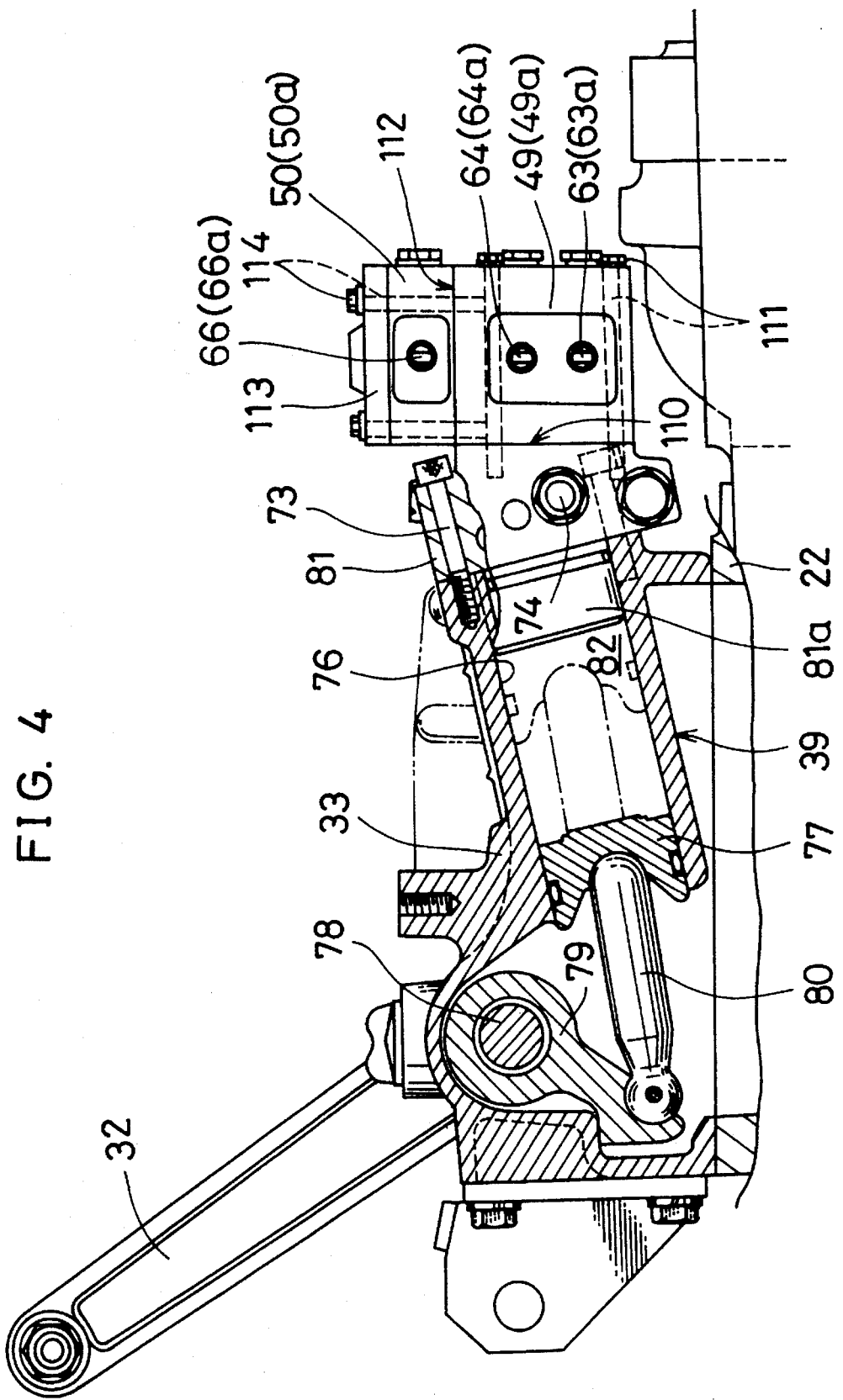
FIG. 4 is a side view, partially in section, of the hydraulic lift mechanism and control valve assemblies shown in FIG. 3.
Figure 5:
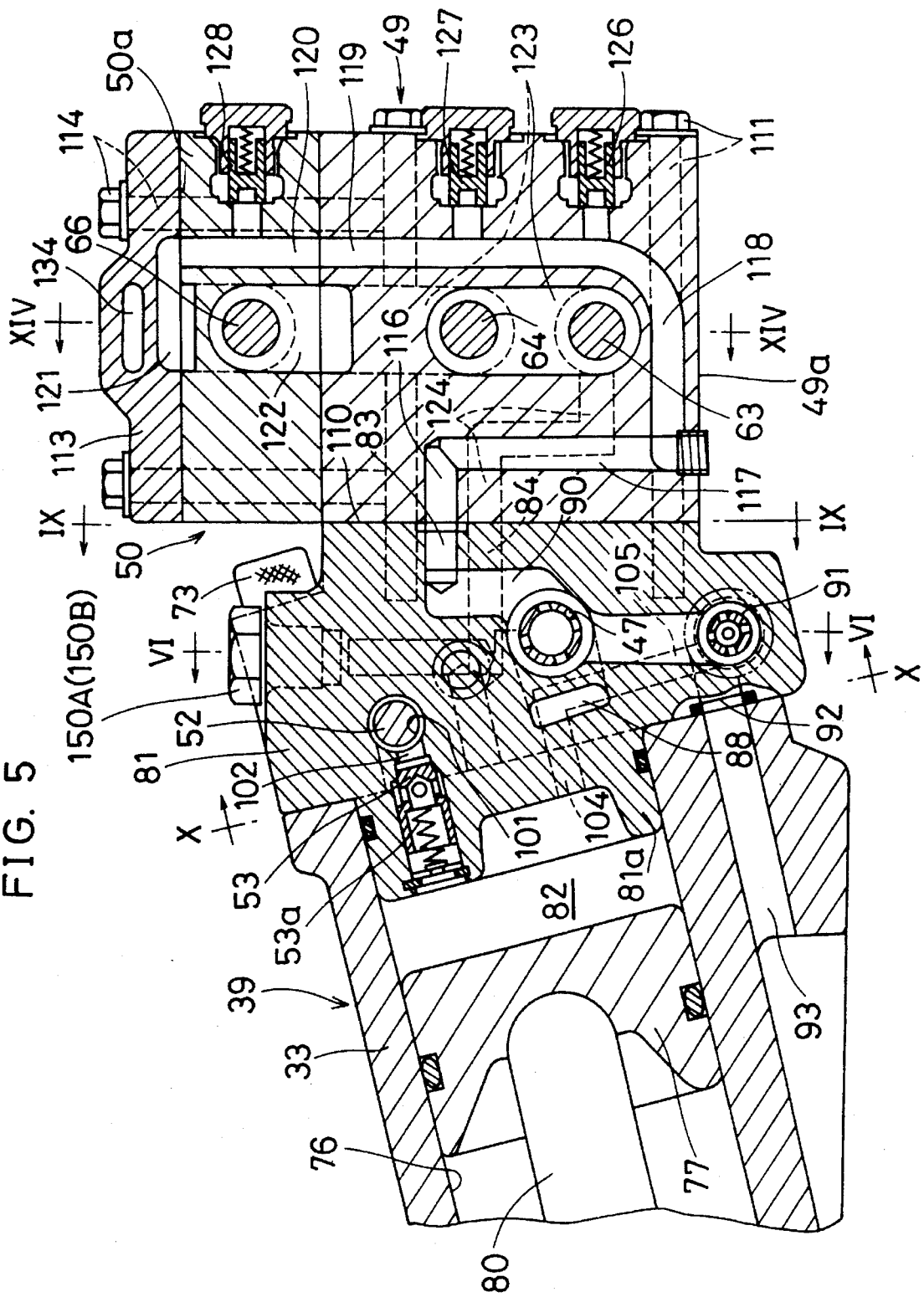
FIG. 5 is an enlarged sectional side view of a part of FIG. 4.

As shown in FIG. 1 and in FIGS. 3 and 4, the cylinder case 33 of the hydraulic lift mechanism is mounted on an upper surface of the transmission casing 22 and supports at its rear end portion the left and right lift arms 32 rockably. As shown in FIGS. 4 and 5, cylinder case 33 includes in it a cylinder bore 76 which is inclined slightly towards a backward and downward direction. A piston 77 is slidably fitted in the cylinder bore 76 whereby the hydraulic lift cylinder 39 is provided. Cylinder case 33 journals a lift arm shaft 78 to which the pair of lift arms 32 are fixedly secured at the outside of case 33. An operating arm 79 located within case 33 is fixedly secured to the shaft 78, and a connecting rod 80 engaging at its ends the operating arm 79 and piston 77 is disposed within cylinder case 33 so that lift arms 32 are rockingly moved upwards by an extending operation of the hydraulic lift cylinder 39. As is usual, front end opening of the cylinder bore 76 is closed using a cylinder head 81 so as to define an operating fluid chamber 82 of the lift cylinder 39. Head 81 includes at its rear end a cylindrical portion 81a to be fitted in the bore 76 and is fastened to the cylinder case 33 using bolts 73 with an inclined posture corresponding to that of cylinder case 33.

Figure 6:
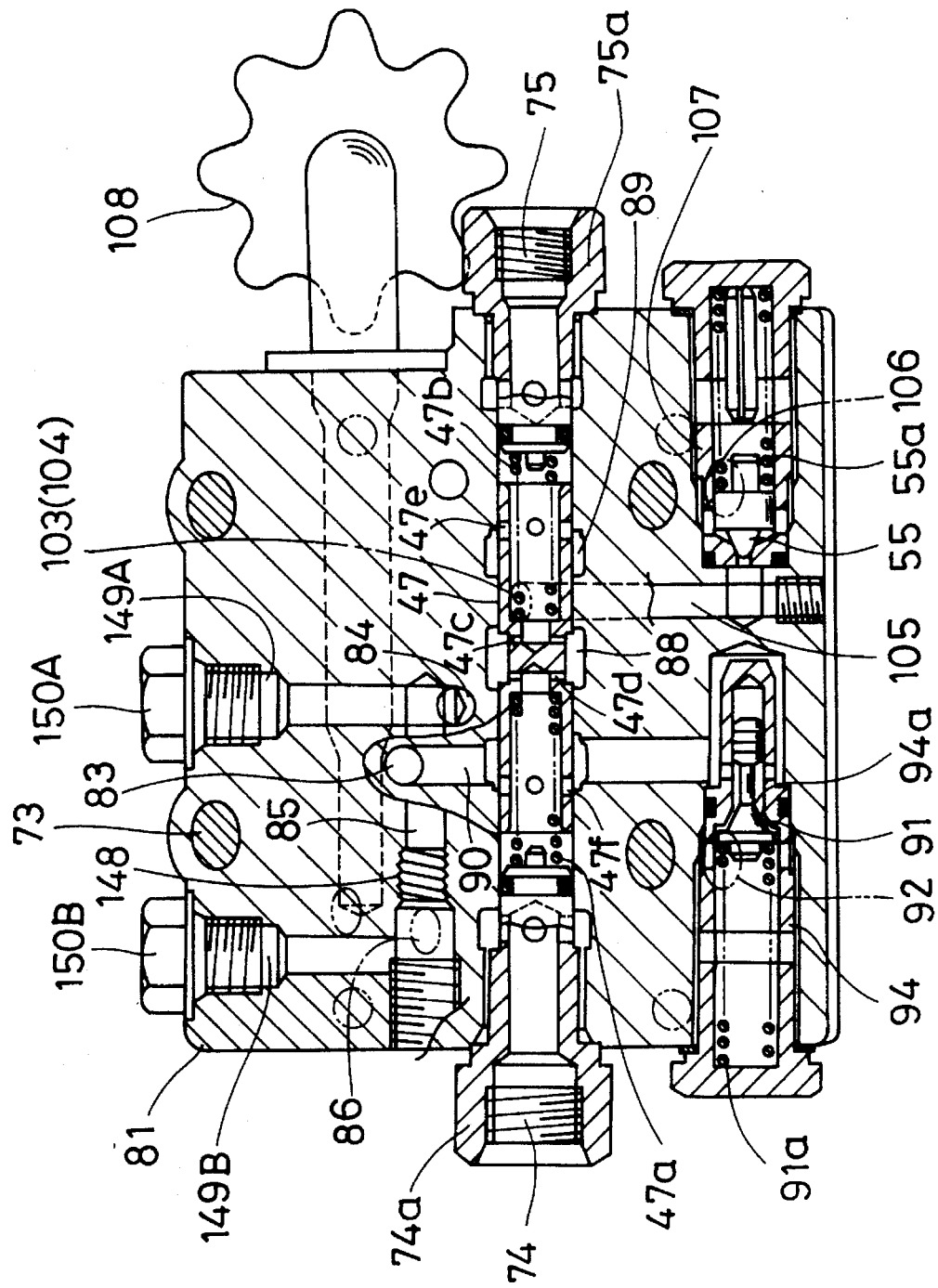
FIG. 6 is a sectional view taken generally along line VI—VI of FIG. 5.
Figure 7:
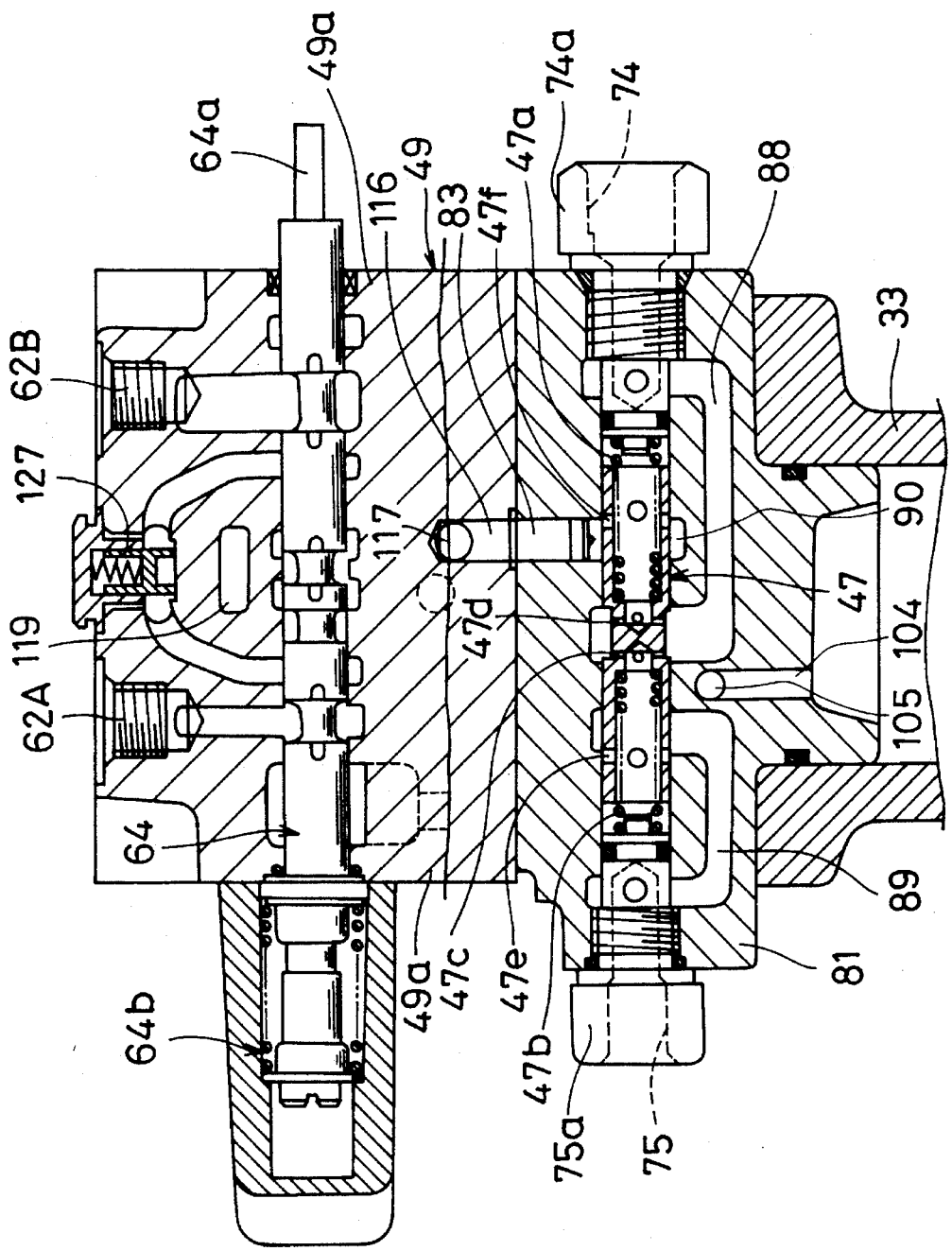
FIG. 7 is a sectional plane view, partially developed, of a cylinder head and control valve assembly shown in FIG. 5.
Figure 8:
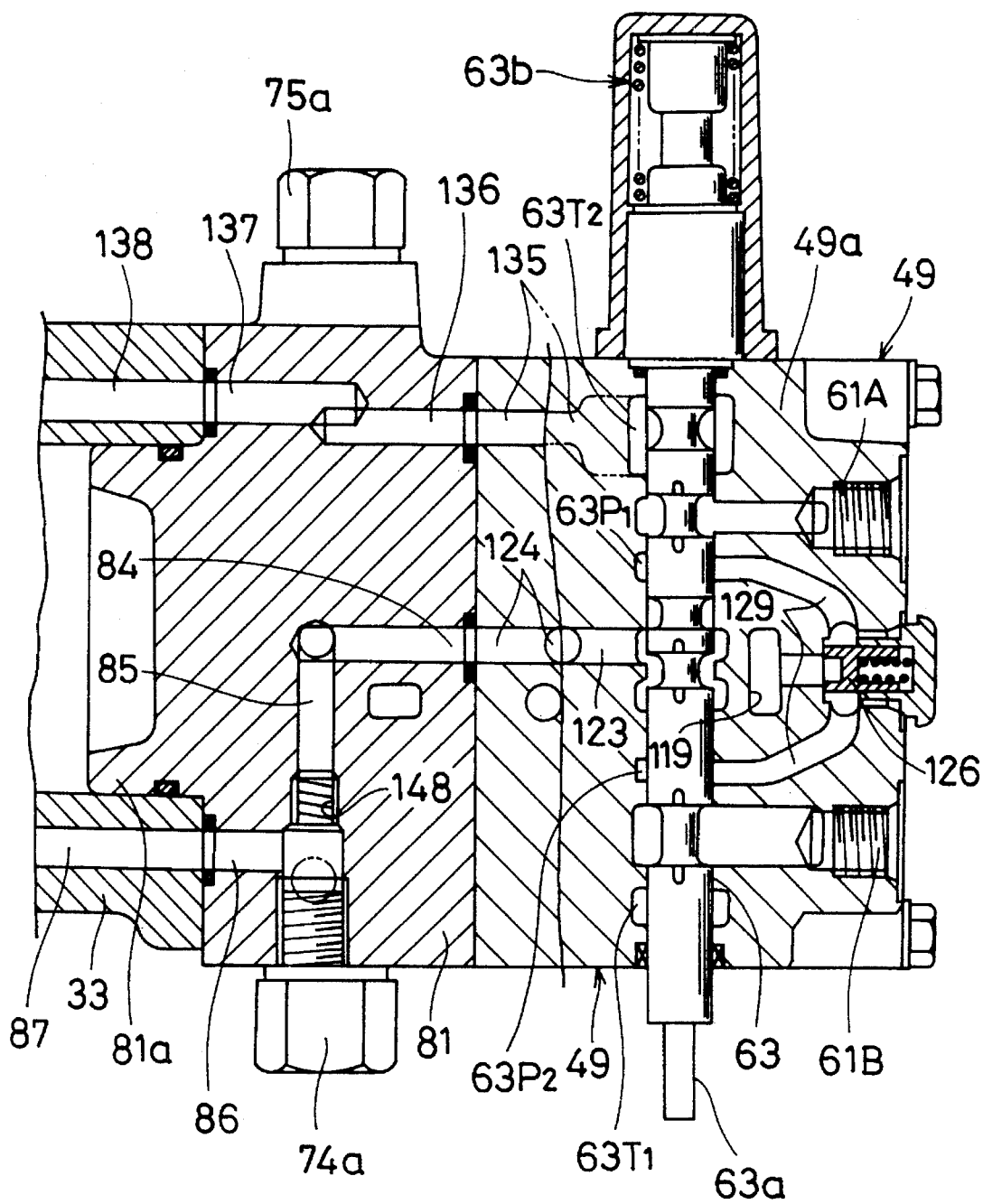
FIG. 8 is a sectional plane view similar to FIG. 7 but illustrating a cross-section different from that shown in FIG. 7.

The structure of the cylinder head 81 will be detailed by referring to FIGS. 5 to 10 and also to FIG. 2. The flow divider 47 set forth above in reference to FIG. 2 is disposed within the cylinder head 81 such that it extends laterally of this head. For providing this flow divider 47, head 81 includes a laterally extending thorough bore having internally threaded ends in which bolts 74a and 75a having internally threaded bores are threadingly fitted, as shown in FIG. 6. The bore of bolt 74a of one side is composed to a fluid input port 74 which is to be connected, as also shown in FIG. 2, to the pump 46, whereas the bore of bolt 75a of the other side is composed to a first fluid output port 75 which is to be connected, as also shown in FIG. 2, to the power steering mechanism 40. As best seen from FIG. 9, head 81 further includes a second fluid output port 83 and a fluid inlet port 84 both of which open at a front surface of this head. As shown in FIG. 2, it is fashioned that the second fluid output port 83 is used for supplying fluid to the second control valve assembly 49 and that the fluid inlet port 84 is used for receiving fluid from the second and third control valve assemblies 49 and 50. As shown in FIGS. 5, 6 and 8, the fluid inlet port 84 is communicated via a laterlly extending fluid passage 85 in the head to a third fluid output port 86 which opens at a rear surface of the cylinder head 81. It is fashioned that the third fluid output port 86 is to be connected via a fluid passage 87 in a sidewall of the cylinder case 33 to the first control valve assembly 48, as can be seen from FIG. 2.

As shown in FIGS. 5 to 7, cylinder head 81 includes a fluid passage 88 which connects fluid input port 74 to an axially mid portion of the flow divider 47, a fluid passage 89 which connects the first fluid outlet port 75 to the flow divider 47 at one side of the passage 88, and a fluid passage 90 which connects the second fluid outlet port 83 to the flow divider 47 at the other side of the passage 88. Flow divider 47 shown is composed of a hollow cylinder including at its axially mid portion an internal partition and is biased to move towards one and the other axial directions by a pair of springs 47a and 47b which are received at their base ends by rod-shaped extentions of the bolts 74a and 75a, respectively.

Divider 47 includes at one and the other sides of its internal partition a pair of radial orifices or perforations 47c and 47d which communicate passage 88 to the hollow spaces of one and the other sides of the internal partition, respectively. Divider 47 further includes another pair of radial perforations 47e and 47f which communicate the hollow spaces of one and the other sides of the internal partition to passages 89 and 90, respectively. Perforations 47e and 47f are adapted to be adjustably throttled by internal walls of the head 81. Consequently, the flow divider 47 is slidingly moved leftwards and rightwards by fluid pressures applied to it from one and the other sides so as to divide its inflow supplied from passage 88 into first and second proportional output flows determined by the ratio of flow area between perforations 47c and 47d and flows out such output flows into passages 89 and 90 and, therefore, to the first and second fluid output ports 75 and 83.

As shown in FIG. 2, a relief valve 91 for establishing or determining fluid pressure in the second fluid output port 83 is also incorporated in the cylinder head 81. That is, as shown in FIGS. 5 and 6, the fluid passage 90 communicating with the second outlet port 83 has a downward extension opening at a lateral bore in the head 81 which bore is communicated via a fluid drainage port 92 in the head 81 and via a fluid passage 93 in the cylinder case 33 into the transmission casing. A separate valve casing 94 is fixedly disposed within the lateral bore set forth above and includes an internal valve seat 94a. The relief valve 91 is disposed within the valve casing 94 such that it is seated on the valve seat 94a under the biasing of a valve spring 91a so as to releasably block flow of fluid from passage 90 to drainage port 92. It is thus seen that relief valve 91 for determining fluid pressure in the second fluid output port 83 is disposed within head 81 such that it is located apart from the flow divider 47 in a vertical direction and extends parallel with the flow divider.

Figure 10:
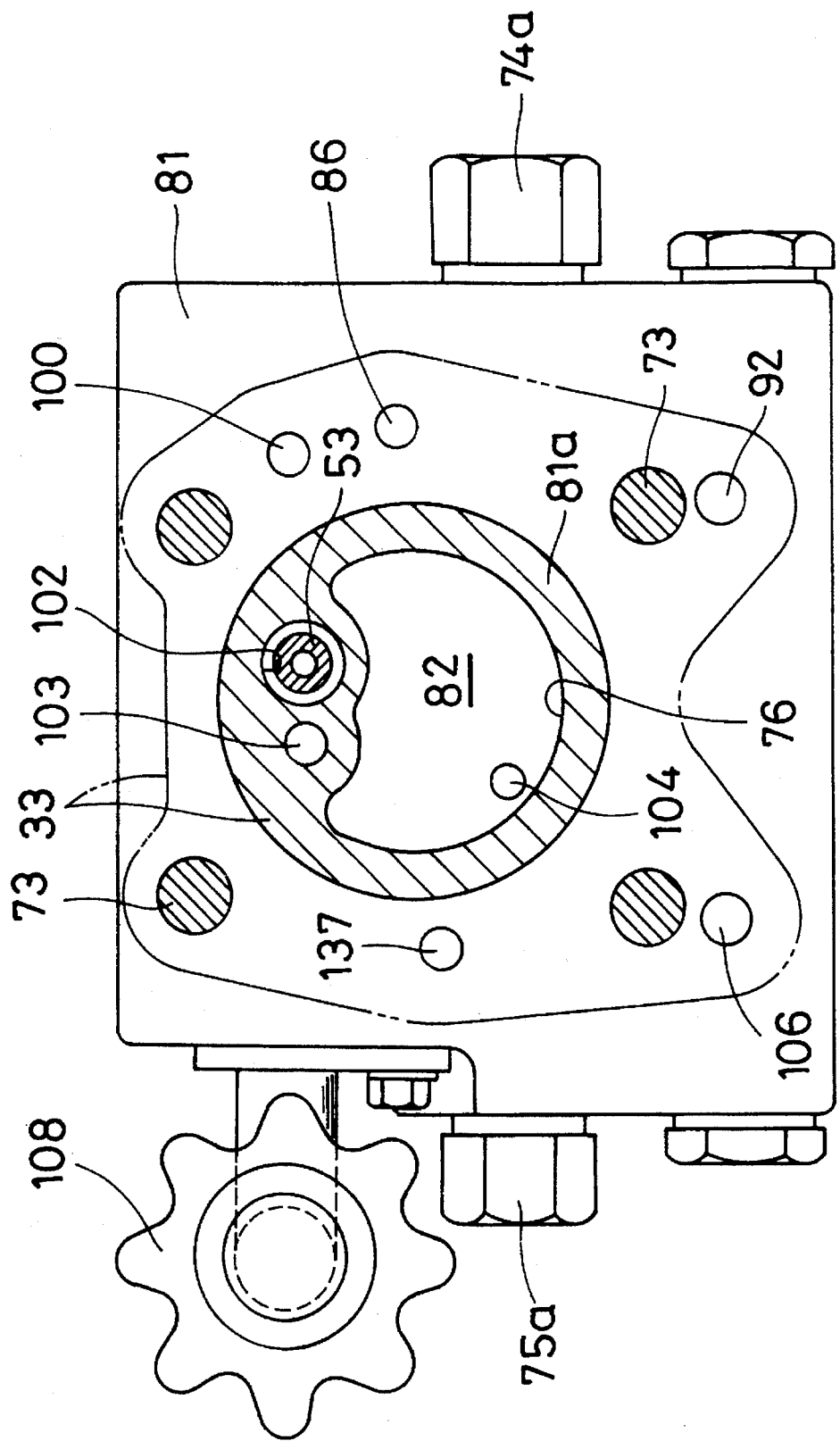
FIG. 10 is a sectional view taken along line X—X of FIG. 5.
Figure 11:
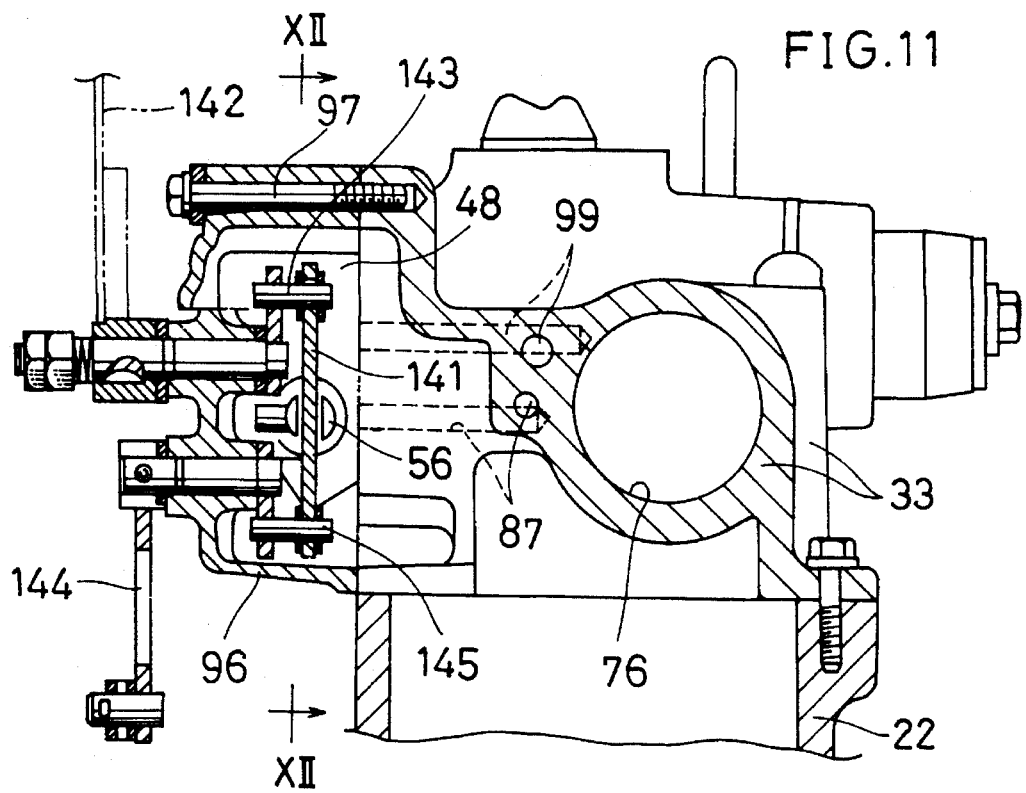
FIG. 11 is a sectional view taken generally along line XI—XI of FIG. 3.
Figure 12:
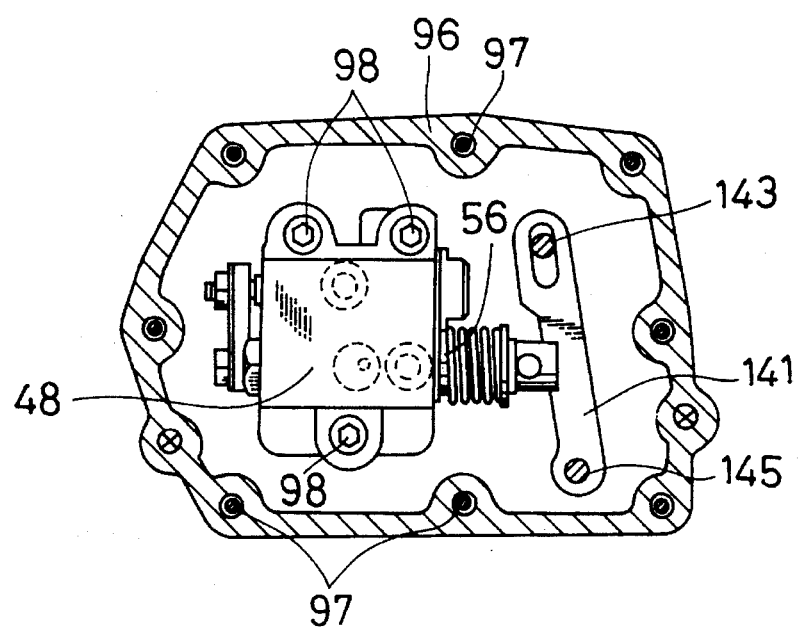
FIG. 12 is a sectional view taken generally along line XII—XII of FIG. 11.

As shown in FIG. 3, cover 96 in the shape of a casing is attached to a side wall of the cylinder case 33 using bolts 97. As shown in FIGS. 11 and 12, the first control valve assembly 48 referred to before in reference to FIG. 2 is arranged within the cover 96 and is mounted on a side surface of the cylinder case 33 using bolts 98. The directional control valve 56 also referred to before in reference to FIG. 2 is composed of a spool which extends at its one end forwardly from a case of the valve assembly 48. As shown in FIG. 11, the cylinder case 33 includes, besides the aforestated fluid passage 87 for connecting the third fluid output port 86 to the first control valve assembly 48, another fluid passage 99 for connecting the valve assembly 48 to an inside of the head 81. This passage 99 is communicated to a second fluid inlet port 100 shown in FIGS. 10 and 13 which is formed in the head 81 so as to open at the rear surface of head.

Figure 13:
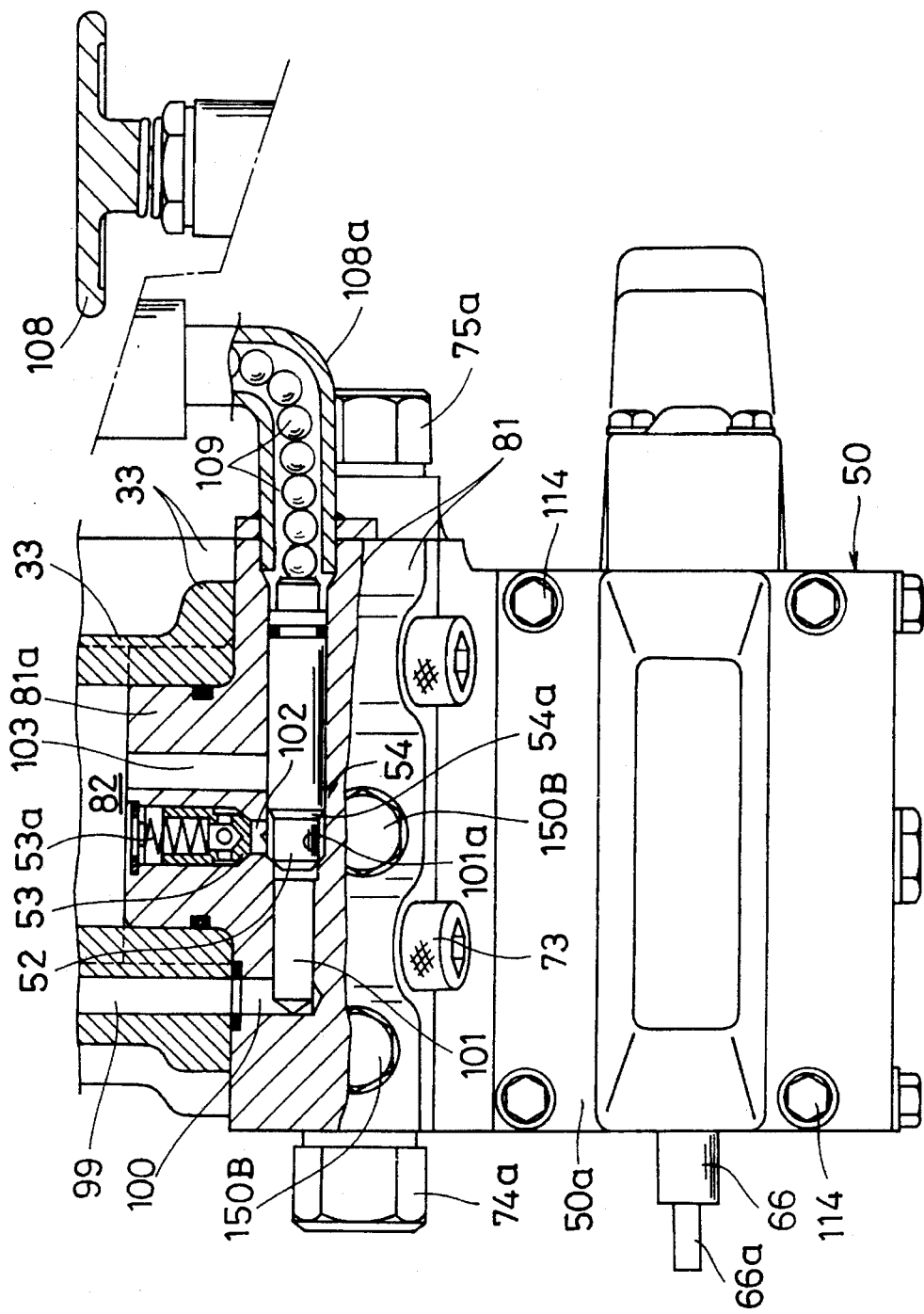
FIG. 13 is a plane view, partially in section, of the cylinder head and control valve assemblies shown in FIG. 5.

The final valve mechanism 51 set forth before in reference to FIG. 2 is also disposed within the cylinder head 81, as will be detailed hereinafter. As clearly shown in FIG. 13, the second fluid inlet port 100 is communicated to the operating fluid chamber 82 of hydraulic lift cylinder 39 through lateral and axial fluid passages 101 and 102 in the head. As shown in FIGS. 5, 10 and 13, two more axial fluid passages 103 and 104 which communicate with the chamber 82 are formed in the head. These passages 103 and 104 are communicated via a downwardly extending fluid passage 105 shown in FIGS. 5 to 7 in the head and via a valve-accomodating bore shown in FIG. 6 formed in the head for accomodating the overload relief valve 55, set forth before in reference to FIG. 2, to a fluid drainage port 106 which is formed in the head so as to open at the rear surface of head 81, as shown in FIG. 10, and is communicated, similarly to the case of the aforestated fluid drainage port 92, into the transmission casing through a fluid passage (not shown) in the cylinder case.

As shown in FIGS. 5 and 13, the stop valve 52 set forth before in reference to FIG. 2 is composed of a slidable valve stem or rod which is slidably disposed in the fluid passage 101. At an intersection between the passages 101 and 102, the inner circumference of passage 101 includes a valve seat 101a on which the stop valve 52 is seated for blocking a fluid communication between passages 101 and 102. In this blocked condition, an end of the passage 103 is also blocked by the stop valve 52 so that the hydraulic cylinder 39 is kept in a fully stopped condition. For opening and closing the stop valve 52, a pipe 108a is attached to one side of the cylinder head 81 and extends laterally outwardly and then rearwardly. A series of balls 109 are disposed in the pipe 108a such that they are displaced by an operation of a rotatable handle 108 supported at the free end of pipe 108a. When the handle 108 is rotated towards a direction of opening the valve 52, balls 109 are made free so that the stop valve is displaced to its open position by fluid pressure applied to its end surface.

As also shown in FIGS. 5 and 13, the relief valve 53 set forth before in reference to FIG. 2 is disposed in the fluid passage 102 and is biased to move by a valve spring 53a from the side of fluid chamber 82. The aforestated throttle 54 is provided by an annular tapered surface 54a on the stop valve 54 and is operable to throttle an end of passage 103 variably in accordance with the position of stop valve 54.

As shown in FIG. 6, the overload relief valve 55 is disposed within a separate valve case 107, which is fixedly disposed in the aforestated valve-accomodating bore between the passage 105 and fluid drainage port 106, such that it blocks an end of the passage 105 by the action of valve spring 55a. This overload relief valve 55 is arranged within the cylinder head 81 at an opposite side of the relief valve 91 for determining fluid pressure in the second fluid output port 83 and extends, as is the case of valve 91, parallel with the flow divider 47.

Figure 9:
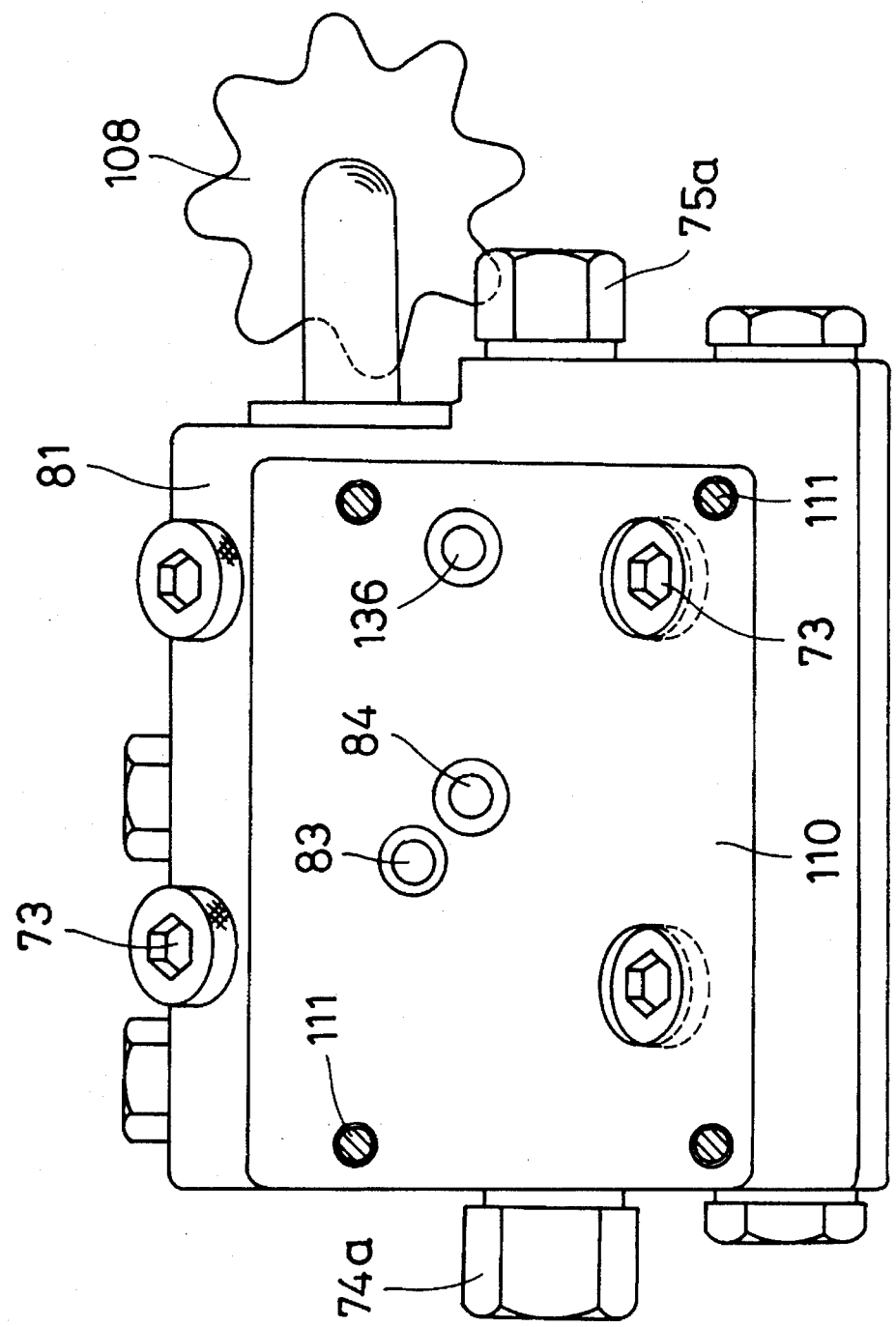
FIG. 9 is a sectional view taken along line IX—IX of FIG. 5.

As shown in FIGS. 4, 5 and 9, the front surface of the cylinder head 81 includes a vertical seating surface 110. As shown in FIGS. 4 and 5, the second control valve assembly 49 set forth before in reference to FIG. 2 is mounted on such seating surface 110 using bolts 111 which extend through a valve housing 49a of this valve assembly 49 and are threadingly engaged with the head 81. The third control valve assembly 50 or its valve housing 50a is mounted together with an upper end cover 113 thereof on a horizotal upper surface 112 of the valve housing 49a of the second assembly using bolts 114 which extend through the valve housing 50a of the third assembly and are threadingly engaged with the valve housing 49a of the second assembly.

Structures of these control valve assemblies 49 and 50 will be detailed in reference to FIGS. 5, 7, 8 and 14. The aforestated directional control valves 63, 64 and 66 are composed of laterally extending spools having operating ends 63a, 64a and 66a which are located at an opposite side of the handle 108 for operating the stop valve 52. Spring mechanisms 63b, 64b and 66b are associated with the other ends of these spools for attaining automatical returns of the spools to respective neutral positions of the directional control valves 63, 64 and 66. Pairs of fluid output ports 61A, 61B; 62A, 62B; and 65A, 65B set forth before in reference to FIG. 2 are arranged as shown in phantom in FIG. 14, and these output ports are formed in the valve housings 49a and 50a such that all of them open at front surfaces of these housings, as shown in FIGS. 7 and 8 with respect to the fluid output ports 62A, 62B and 61A, 61B connected to the directional control valves 64 and 63.

Figure 14:
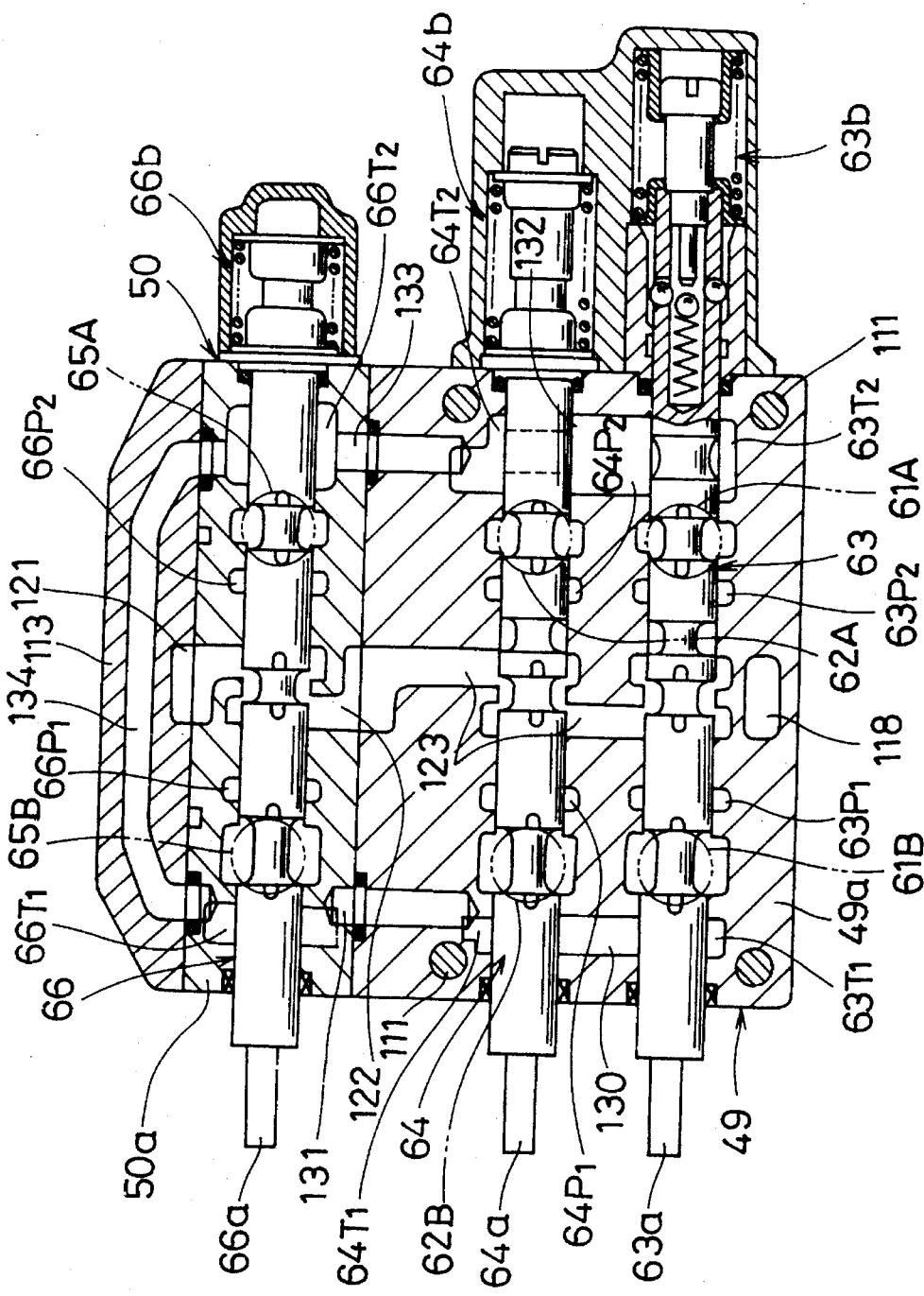
FIG. 14 is a sectional view taken along line XIV—XIV of FIG. 5.

As shown in FIG. 5, a fluid input port 116 which is aligned with the second fluid output port 83 in the cylinder head 81 is formed in the valve housing 49a of the second control valve assembly 49. The valve housing 49a includes a downwardly extending fluid passasage 117, forwardly extending fluid passage 118 and upwardly extending fluid passage 119 which are adapted to flow fluid supplied to the input port 116 to an underside of the valve housing 50a of the third control valve assembly 50. A vertical fluid passage 120 which is aligned with fluid passage 119 is formed in the latter housing 50a and is communicated to a fluid passage 121 which is provided by a recess in the inner surface of the cover 113. As shown in FIGS. 5 and 14, fluid passages 122 and 123 for flowing fluid from the passage 121 downwardly are formed in the valve housings 50a and 49a. The passage 123 in the housing 49a is communicated via a bent fluid passage 124, shown in FIGS. 5 and 8, in the housing 49a to the aforestated fluid inlet port 84 in the cylinder head 81. The fluid passages 122 and 123 pass respectivly across axially mid portions of the spools of the directional control valves 66, 64 and 63, and it is designed that, at the neutral positions shown of these control valves, fluid supplied from the second fluid output port 83 flows, as it is, into the fluid inlet port 84 and is supplied towards the first control valve assembly 48.

The fluid passages 119 and 120 in the housing 49a and 50a which passages are communicated with the second fluid output port 83 in the cylinder head 81 are communicated to pairs of left and right fluid supply ports $63P_1$, $63P_2$; $64P_1$, $64P_2$; and $66P_1$, $66P_2$, shown in FIG. 14, of the directional control valves 63, 64 and 66 through check valves 126, 127 and 128 shown in FIG. 5. That is, as shown in FIG. 8 with respect to the directional control valve 63, passage 119 is communicated to a primary side of a check valve 126 which is disposed in a front end portion of the valve housing 49a, and a secondary side of the check valve 126 is communicated to the left and right fluid supply ports $63P_1$ and $63P_2$ through left and right curved fluid passages 129. Similar structures are employed with respect to the directional control valves 64 and 66.

As shown in FIG. 14, directional control valves 63, 64 and 66 further have pairs of left and right fluid drainage ports $63T_1$, $63T_2$; $64T_1$, $64T_2$; and $66T_1$, $66T_2$. There are formed in the valve housings 49a and 50a a set of fluid passages 130 and 131 for connecting between ports $63T_1$, $64T_1$ and $66T_1$ and another set of fluid passages 132 and 133 for connecting between ports $63T_2$, $64T_2$ and $66T_2$. These fluid passages 130–133 are further connected with one another by a fluid passage 134 in the cover 113. As shown in FIG. 8, a fluid passage 135 which is communicated with the fluid drainage port $63T_2$ and opens at the rear surface of the housing 49a is formed in this housing and is communicated to a fluid passage 136 which is formed in the cylinder head 81 so as to open at the front surface of this head. Head 81 further includes a fluid drainage port 137 which is in fluid communication with passage 136 and opens at the rear surface of the head. This port 137 is communicated via a fluid passage 138 in the cylinder case 33 into the transmission casing, as is the case of the aforestated drainage port 92 shown in FIG. 5.

Spools constituting the directional control valves 63, 64 and 66 comprise respectively lands which are operable in response to the positions of spools to communicate and block selectively between the fluid output ports, fluid supply ports and fluid drainage ports having been detailed above so as to attain controls of fluid flows set forth before in reference to FIG. 2.

The directional control valve 56 of the first control valve assembly 48 is adapted to be returned to its neutral position by a well-known feedback mechanism. That is, as shown in FIGS. 11 and 12, a cotrol link 141 engaging an end of the spool constituting the valve 56 is disposed within the cover 96 and is engaged at its one end by a pin 143 which is displaced by a control lever 142 for the hydraulic lift mechanism. A feedback link 144 which is rockingly displaced in response to the lifting and lowering movement of lift arms 32 shown in FIGS. 1, 3 and 4 is arranged at an outside of the cover 96, and another pin 145 which is displaced by this feedback link 144 is attached to the other end of the control link 141. From this, when the directional control valve 56 is displaced from its neutral position using the control lever 142, the valve 56 is returned again to the neutral position after the lift arms have been moved by an amount corresponding to the displaced amount of lever 142. Further details of the feedback mechanism is described in the aforecited U.S. Pat. No. 4,643,442. In addition, control mechanisms for the directional control valves 63, 64 and 66 may be designed similarly to the ones disclosed in this U.S. patent.

The third control valve assembly 50 shown is used for the control of lifting and lowering of the mower 28 shown in FIG. 1. But, when the vehicle shown in FIG. 1 is to be equipped with another fluid-operated auxiliary implement in place of the mower, this control valve assembly 50 can be used, as it is, for such another implement. In the first embodiment shown, a further mechanism is provided which permits a further taking-out of fluid under pressure from the cylinder head 81 when the working vehicle is equipped with an additional auxiliary implement such as a back hoe or the like, as will be detailed below.

As shown in FIGS. 6 and 8, the fluid passage 85 in head 81 which is communicated to the third fluid output port 86 includes an internally threaded circumferential wall 148 which is adapted to receive a threaded plug (not shown) so as to block fluid communication of the passage 85 to the fluid output port 86. A pair of ports 149A and 149B which are communicated to the passage 85 at one and the other sides of the threaded wall 148 are formed in the head 81 such that these ports open at an upper surface of the head. These ports 149A and 149B are releaseably closed using threaded plugs 150A and 150B. Consequently, if a threaded plug is threadingly received by the threaded internal wall 148 and if the threaded plugs 150A and 150B are replaced by fittings for connecting fluid pipes to be connected to a separate control valve for a back hoe or the like, fluid under pressure can be taken out from the port 149A and return fluid can be received into the port 149B. This fluid taking-out mechanism set forth above is also illustrated schematically in FIG. 2.

Figure 15:
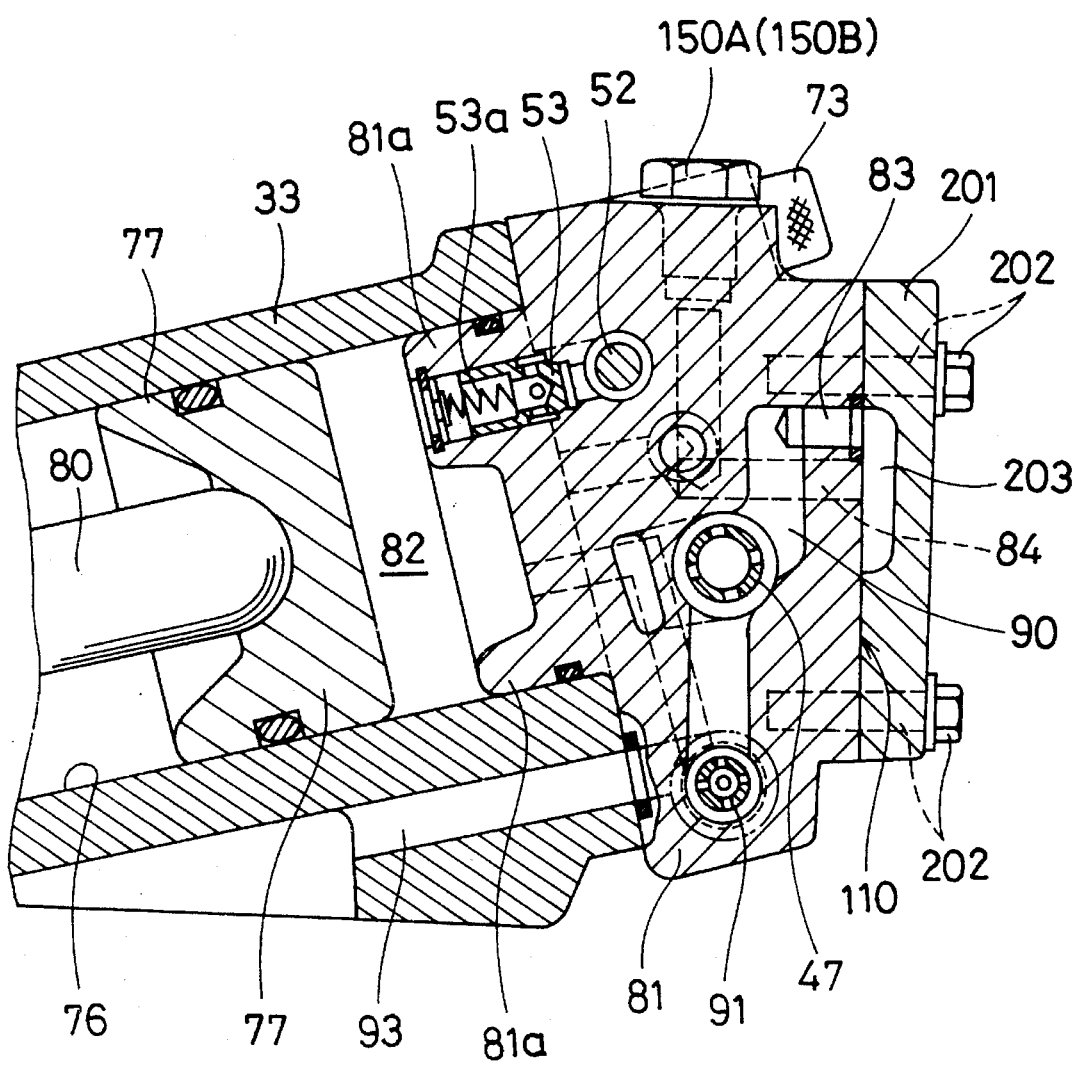
FIG. 15 is a sectional view similar to FIG. 5 but showing a second embodiment of the present invention.

The first embodiment having been detailed hereinbefore is adapted for use in a working vehicle which is adapted to be equipped not only with an auxiliary implement such as a rotary tiller, which is to be drawn by the vehicle so as to be liftable by a hydraulic lift mechanism and is to be driven by a rear PTO shaft such as the one (31) shown in FIG. 1, but also with two other auxiliary implements such as a front loader and a mower. In a fluid supply assembly for use in a working vehicle which is designed so as to be equipped with only an auxiliary implement to be drawn by the vehicle, the second and third control valve assemblies 49 and 50 can be omitted. A second embodiment having such structure is shown in FIG. 15. In the fluid supply assembly shown in FIG. 15, the structure of the cylinder head 81 is identical with that of the cylinder head employed in the first embodiment. A cover member 201 is mounted or attached to the vertical seating surface 110 of such head 81 using bolts 202. Cover member 201 includes in its inner surface a recess which defines a fluid passage 203 in co-operation with the seating surface 110. The second fluid output port 83 in the head 81 is directly connected to the fluid inlet port 84 in this head by the passage 203.

Further, the third control valve assembly 50 can be omitted for a working vehicle of a design which is not equipped with mower 28 shown in FIG. 1, whereas the second control valve assembly 49 can be omitted for a working vehicle of a design which is not equipped with front loader 27 shown in FIG. 1. In the latter case, a control valve assembly corresponding to the third valve assembly 50 can be mounted on the front of cylinder head 81. A third embodiment having such structure is shown in FIG. 16.

Figure 16:
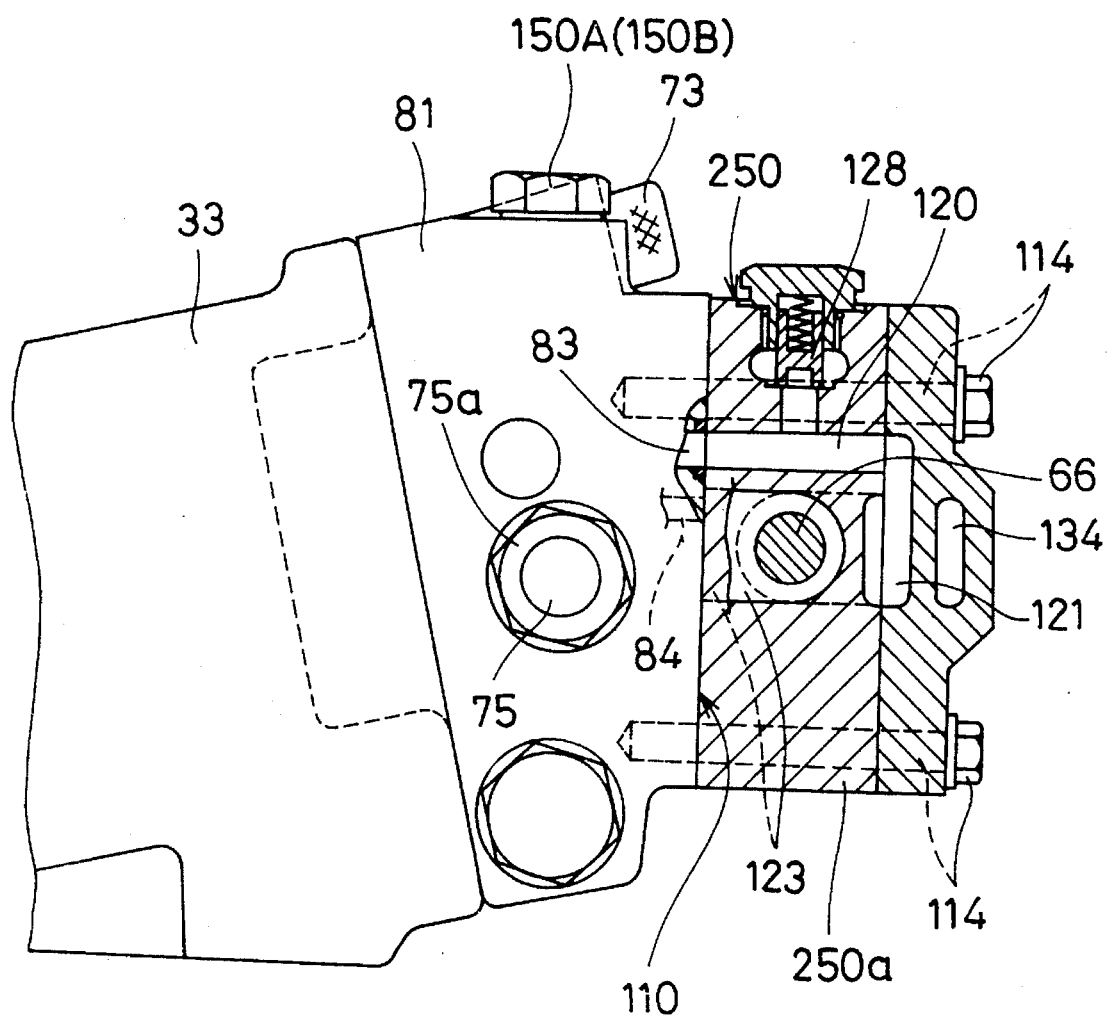
FIG. 16 is a side view, partially in section, showing a third embodiment of the present invention.

In the fluid supply assembly shown in FIG. 16, a second control valve assembly 250 having a structure same as that of the third control valve assembly 50 employed in the first embodiment is mounted on the seating surface 110 of the cylinder head 81 using bolts 114 which are identical with bolts 114 used in the first embodiment. That is, in consideration for use of the third control valve assembly 50 in a fashion shown in FIG. 16, the valve assembly 50 is designed already in the first embodiment such that, when this assembly 50 is employed as the second control valve assembly 250 shown in FIG. 16, required communications between fluid passages are attained as it is and such that pitches of the fastener bolts 111 and 114 for the valve housings 49a and 50a are made equal so that bolts 114 can be used also in the structure shown in FIG. 16. In the third embodiment, the second control valve assembly 250 or its valve housing 250a includes fluid passages 120 and 123 same as the ones described before in respect to the first embodiment, and these passages 120 and 123 are communicated respectively to the second fluid output port 83 and fluid inlet port 84 in the cylinder head 81.

Although fluid output ports of the control valve assemblies employed in the first and third embodiments are arranged such that they open forwards of the fluid supply assembly, such fluid output ports may be arranged in a working vehicle having a seat of a relatively high level such that they open upwards of the fluid supply assembly. A fourth embodiment having such structure is shown in FIG. 17.

Figure 17:
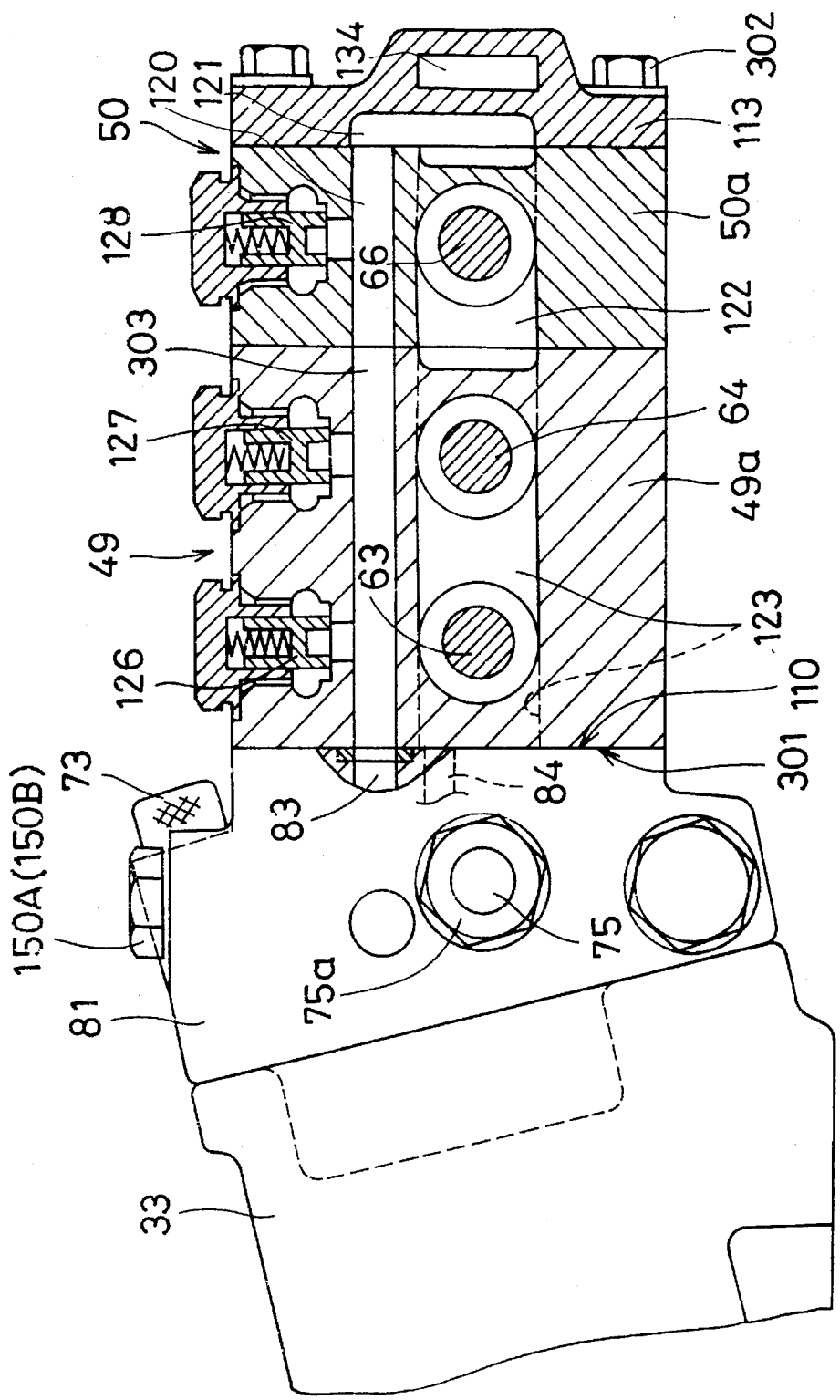
FIG. 17 is a side view, partially in section, showing a fourth embodiment of the present invention.

In the fluid supply assembly shown in FIG. 17, second and third control valve assemblies 49 and 50 are fixedly mounted on a front of the cylinder head 81 using bolts 302 common to these assemblies in a condition that a surface 301 of the second control valve assembly corresponding to the lower surface of the second control valve assembly 49 shown in FIG. 2 is in contact with the seating surface 110 of head 81. A fluid passage 303 corresponding to the aforestated fluid passage 119 is formed in the valve housing 49a so as to open at the surface 301 and is communicated directly to the second fluid output port 83 in the head 81. Fluid passage 123 identical with the aforestated passage 123 is formed so as to open also at the surface 301 and is communicated directly to the fluid inlet port 84 in the head 81. Similarly, fluid passages communicating with fluid drainage ports (both not shown) of the respective directional control valves 63, 64 and 66 can be communicated directly to the inside of head 81. As is the case of the first embodiment, fluid output ports (not shown) of the valve assemblies 49 and 50 are arranged such that they open at the side of check valves 126, 127 and 128. Consequently, such output ports open upwards.

While preferred embodiments of the invention have been described, it will be appreciated that various modifications and changes may be made without departing from the spirit of the present invention. For example, while it has been described that the first fluid outlet port 75 formed in the cylinder head 81 of hydraulic lift cylinder is to be used for supplying fluid to a power steering mechanism 40, such first fluid outlet port may also be used for supplying fluid to another fluid-actuated means in a relatively small-scaled vehicle in which a mechanical steering mechanism is provided in place of the power steering mechanism shown. An example of such another fluid-actuated means is a back hoe which is actuated through fluid actuator means. Another example is a fluid-actuated posture-controlling device for keeping a rotary tiller to be drawn by a vehicle in a horizontal posture. Accordingly, the present invention is to be limited only by the fair meaning and scope of the appended claims.

We claim:

1. In a working vehicle comprising: a hydraulic lift mechanism for lifting and lowering an auxiliary implement to be connected liftably to the vehicle, said lift mechanism including a hydraulic lift cylinder having a cylinder case and a cylinder head thereof; a first control valve assembly mounted on said cylinder case for controlling supply of fluid to said lift cylinder; and a power steering mechanism for steering the vehicle, a fluid supply assembly characterized in:

that said cylinder head (81) includes a fluid input port (74) opening at an outer surface of said head, and a flow divider (47) for dividing inflow of said input port into two divided flows;

that a first fluid output port (75) for supplying one of said divided flows to said power steering mechanism (40) is formed in said cylinder head (81) such that said first output port opens at an outer surface of said head; and that a second fluid output port (83) for taking-out the other of said divided flows and a fluid inlet port (84) for directing fluid flow towards said first control valve assembly (48) are formed in said cylinder head (81) such that said second output port and said inlet port open at a front surface of said head, said second fluid output port and said fluid inlet port being connected through fluid passage means within a cover member (49a, 50a; 201; 250a) which is detachably mounted on said front surface of said cylinder head.

2. The fluid supply assembly as set forth in claim 1, wherein said flow divider (47) extends generally laterally of said cylinder head (81), said fluid input port (74) opening at one side surface of said head while said first fluid output port (75) opening at another side surface of said head.

3. The fluid supply assembly as set forth in claim 2, wherein said fluid input port (74) and said first fluid output port (75) are disposed generally coaxially with said flow divider (47).

4. The fluid supply assembly as set forth in claim 2, wherein a relief valve (91) for determining fluid pressure in said second fluid output port (83) is disposed within said cylinder head (81) such that said relief valve is located apart from said flow divider (47) in a vertical direction and extends parallel with said flow divider.

5. The fluid supply assembly as set forth in claim 1 or 2, wherein said front surface of said cylinder head (81) includes a substantially vertical seating surface (110) on which a second control valve assembly (49; 250) having said cover member (49a; 250a) as a valve housing thereof is detachably mounted, said second fluid output port (83) and said fluid inlet port (84) being connected through said second control valve assembly.

6. The fluid supply assembly as set forth in claim 5, wherein said second control valve assembly (49) includes at least one fluid outlet port (61A, 61B, 62A, 62B) which opens at a front surface of said cover member (49a).

7. The fluid supply assembly as set forth in claim 6, wherein a third control valve assembly (50) which has a valve housing (50a) and at least one fluid output port (65A, 65B) opening at a front surface of the said valve housing is detachably mounted on an upper surface of said cover member (49a), said second fluid output port (83) and said fluid inlet port (84) being connected through said second and third valve assemblies (49, 50).

8. In a working vehicle comprising: a hydraulic lift mechanism for lifting and lowering an auxiliary implement to be connected liftably to the vehicle, said lift mechanism including a hydraulic lift cylinder having a cylinder case and a cylinder head thereof; a first control valve assembly mounted on said cylinder case for controlling supply of fluid to said lift cylinder; and a fluid-actuated means, a fluid supply assembly characterized in:

that said cylinder head (81) includes a fluid input port (74) opening at an outer surface of said head, and a flow divider (47) for dividing inflow of said input port into two divided flows;

that a first fluid output port (75) for supplying one of said divided flows to said fluid-actuated means (40) is formed in said cylinder head (81) such that said first output port opens at an outer surface of said head; and that a second fluid output port (83) for taking-out the other of said divided flows and a fluid inlet port (84) for directing fluid flow towards said first control valve assembly (48) are formed in said cylinder head (81) such that said second output port and said inlet port open at a front surface of said head, said second fluid output port and said fluid port being connected through fluid passage means whithin a cover member (49a, 50a; 201; 250a) which is detachably mounted on said front surface of said cylinder head.

9. The fluid supply assembly as set forth in claim 8, wherein said flow divider (47) extends generally laterally of said cylinder head (81).

10. The fluid supply assembly as set forth in claim 9, wherein said fluid input port (74) opens at one side surface of said head while said first fluid output port (75) opens at another side surface of said head.

11. The fluid supply assembly as set forth in claim 8, wherein a second control valve assembly (49; 250) having said front cover member (49a; 250a) as a valve housing thereof is detachably mounted on said front surface of said cylinder head (81), said second fluid output port (83) and said fluid inlet port (84) being connected through said second control valve assembly.

* * * * *